US006483813B1

United States Patent
Blencowe

(10) Patent No.: US 6,483,813 B1
(45) Date of Patent: Nov. 19, 2002

(54) SYSTEMS FOR MONITORING COMMAND EXECUTION TIME

(75) Inventor: Andrew Blencowe, Windham, NH (US)

(73) Assignee: Argentanalytics.Com, Inc., Nashua, NH (US)

( * ) Notice: Subject to any disclaimer, the term of this patent is extended or adjusted under 35 U.S.C. 154(b) by 0 days.

(21) Appl. No.: 09/344,679

(22) Filed: Jun. 25, 1999

(51) Int. Cl.[7] .............................................. H04L 12/26
(52) U.S. Cl. ......................... 370/252; 714/25; 714/39; 714/47
(58) Field of Search ................................ 370/503, 252; 714/47, 39, 25

(56) References Cited

U.S. PATENT DOCUMENTS 6,279,002 B1 * 8/2001 Lenz et al. .................... 707/10
6,317,786 B1 * 11/2001 Yamane et al. ............. 709/224
6,411,998 B1 * 6/2002 Bryant et al. ............... 709/224

* cited by examiner

Primary Examiner—Melvin Marcelo
Assistant Examiner—Scott A. Waite
(74) Attorney, Agent, or Firm—Davis & Bujold, P.L.L.C.

(57) ABSTRACT

A monitoring system for monitoring the typical response time required to execute a command at a desired remote site, e.g. a website. The monitoring system includes a mechanism for synchronizing the real-time internal clock at both the administrative node and the transaction node. Once both real-time internal clocks are synchronized, a synthetic transaction is generated by the administrative node and sent to the transaction node. The instant at which the command is sent is recorded by the administrative node. The command is received by the transaction node and each important step involved in executing the command is recorded with a time stamp information. Once the command has been completed, the results of the synthetic command, e.g. the requested data, drawing(s), diagram(s) or information, are sent to the administrative node along with the time stamp information indicating the elapsed time for executing each important step of the synthetic transaction. The instance at which the results of the synthetic command are received at the administrative node is recorded and the total elapsed response time for executing the command is then determined. Thereafter, the time line information of both the administrative node and the transaction node can be combined with one another, due to the synchronization of the clocks, and the administrative node can generate a time line indicating the total response time required to execute each important step of the command. This information is useful in facilitating a reduction in the total response time required to execute a command sent from remote node site to another remote node.

16 Claims, 6 Drawing Sheets

SYSTEMS FOR MONITORING COMMAND EXECUTION TIME

The present invention relates to a system to facilitate monitoring of the execution time of a command sent from one remote node to a second remote node over a communication system and, more particularly, the monitoring of the execution of a command sent from one remote computer or node to a second remote computer or node over the global communication system or some other network.

BACKGROUND OF THE INVENTION

A variety of known communication systems and networks are currently employed to transmit data, drawing(s), diagram (s), information, etc. from one remote site or node to a second remote site or node. A critical component which facilitates effective communication from one remote node to a second remote node is the "response time". That is, the elapsed time from the instant when a command is sent from the first remote node to a second remote node to the instant when the transmitted data, drawing(s) diagram(s), information, etc. is received by the first remote node from the second remote node. The primary goal, in all communication systems, is to strive for the shortest elapse time from the instant when the command is sent to the second remote node to the instant when the requested data, drawing (s), diagram(s), information, etc. is received at the first remote node.

In order to keep pace with the continued improvements in technology, users of the world wide web, as well as other communication networks, are demanding shorter and shorter response times. Businesses and advertisers utilizing such communications systems and/or networks are also requiring quicker response times to facilitate improved sales, distribution, marketing, promotion, advertising, etc., of products, goods, items and/or services. With a greater focus being paid to the response time required for executing commands, website owners are increasingly paying closer attention to the time required to execute each command received by the website from a remote request node.

To assist website owners with determining the typical response time required to execute a command at a website, Keynote Systems, of San Mateo, Calif., provides a very basic monitoring service which only determines the total elapsed time from the instance the command is sent to instant the requested data, drawing(s) diagram(s), information, etc. are received. Generally, Keynote Systems will contact a desired website periodically, e.g. once every ten (10) minutes and request retrieval of the website's home page, and then provide to the client very basic information concerning the total elapse time required to execute such command. While such total elapsed time is somewhat useful to website owners, advertisers, businesses, administrators of website, etc., the total elapsed time information does not provide any meaningful information which is useful in attempting to streamline or decrease the total elapsed time required for executing the command. That is, there is no information being provided concerning which step or steps of the executed command required a significant or substantial amount of time thereby substantially hampering efficient execution of the command. If website owners, advertisers, businesses, administrators of website, etc. were to be provided with such information, then such information could be utilized in modifying the website, or other node connected to the communication system, to facilitate decreasing the response time required to execute the received command.

SUMMARY OF THE INVENTION

Wherefore, it is an object of the present invention to provide a monitoring systems which overcomes the above noted drawbacks associated with the prior art monitoring systems.

A further object of the present invention is to provide a monitoring system which monitors the discrete time required to execute each desired or important step of a command and provides this time information to an administrative node to assist the administrative node with streamlining or decreasing the execution time for the command.

A further object of the present invention is to provide a monitoring system which facilitates synchronization of the internal real-time clocks, at both an administrative node as well as a transaction node, to provide a common baseline for determining the total elapsed time for execution of the command as well as the discrete time required to execute each step of the command.

Yet another object of the present invention is to provide a monitoring system with backend software which precisely detects, at the transaction node, the elapse time required to execute each important step involved in executing the command and to send the detected elapse time information to the administrative node for use in streamlining or decreasing the execution time of the command.

The present invention relates to a system for monitoring a total response time for executing a synthetic transaction over a communication system, said monitoring system comprising: a communication system for conveying information; an administrative node being coupled to the communication system and the administrative node having an internal clock; a transactional node being coupled to the communication system and the transactional node having an internal clock; means for synchronizing the internal clock of both the administrative node and the transaction node to display an identical time; means for generating and sending a synthetic transaction from the administrative node to the transaction node for execution via the communication system and recording the sending time of the synthetic transaction; means for receiving and executing, at the transaction node, the synthetic transaction sent by the administrative node while recording a time of receipt and a required time to complete each desired step of the synthetic transaction; means for transmitting a result of the synthetic transaction to the administrative node, via the communication system, along with time information indicating the time required to complete each desired step of the synthetic transaction; and means for generating the total response time required to execute the synthetic transaction.

The present invention also relates to a method for monitoring a total elapsed response time for executing a command over a communication system, the method comprising the steps of: providing a communication system for conveying information; coupling an administrative node to the communication system and providing the administrative node with an internal clock; coupling a transactional node to the communication system and providing the transactional node with an internal clock; synchronizing the internal clock of both the administrative node and the transaction node to display an identical time; generating and sending a synthetic transaction from the administrative node to the transaction node for execution via the communication system and recording the sending time of the synthetic transaction; receiving and executing, at the transaction node, the synthetic transaction sent by the administrative node while recording a time of receipt of the sent synthetic transaction and a required time to complete each desired step of the synthetic transaction; transmitting a result of the synthetic transaction to the administrative node, via the communication system, along with time information indicating the time required to complete each desired step of the synthetic transaction; and generating the total response time required to execute the synthetic transaction.

BRIEF DESCRIPTION OF THE DRAWINGS

The invention will now be described, by way of example, with reference to the accompanying drawings in which.

DESCRIPTION OF THE PREFERRED EMBODIMENTS(S)

Figure 1:
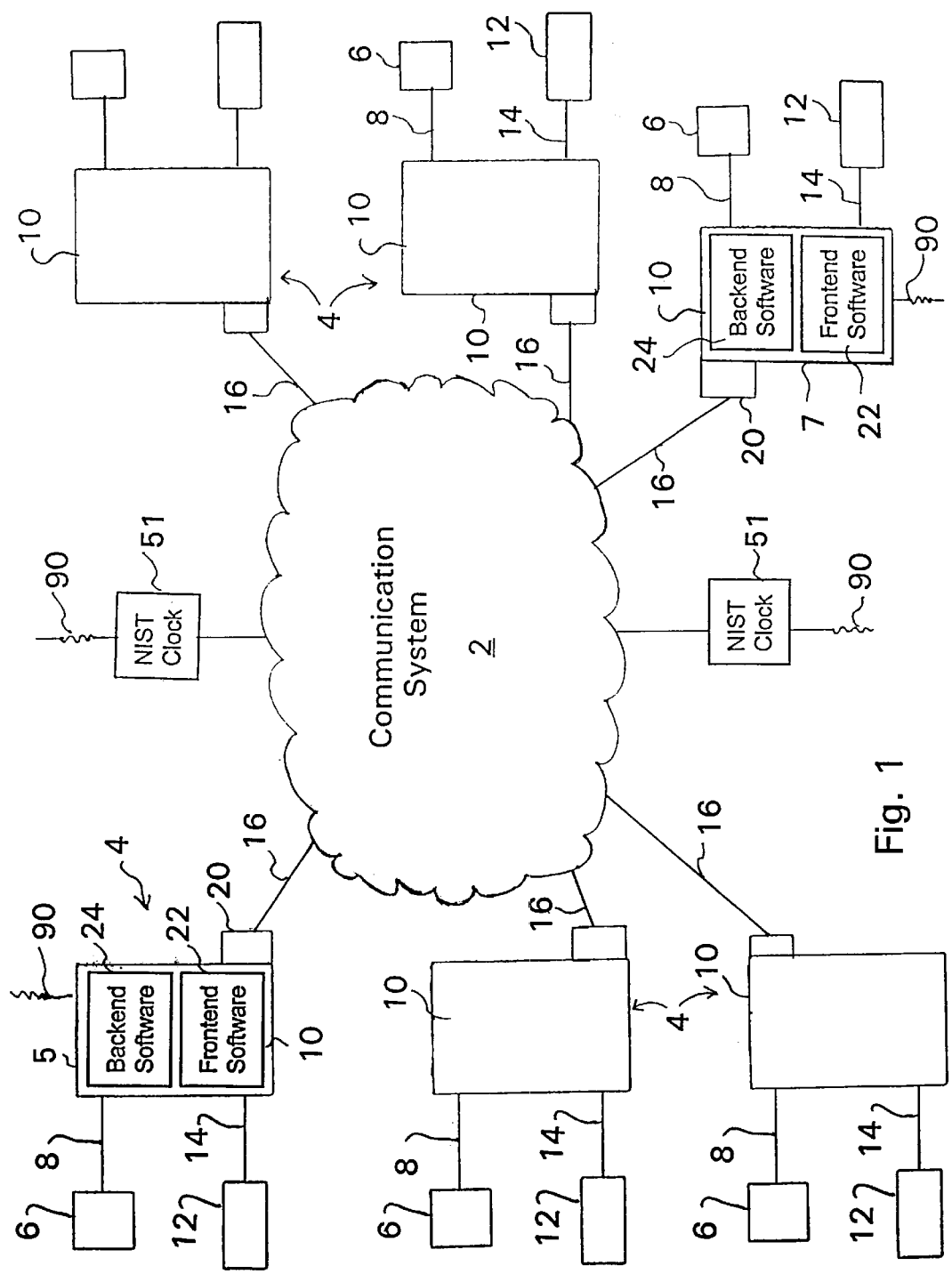
FIG. 1 is a diagrammatic representation showing a plurality of remote nodes being connected with one another via a communications system.
Figure 2:
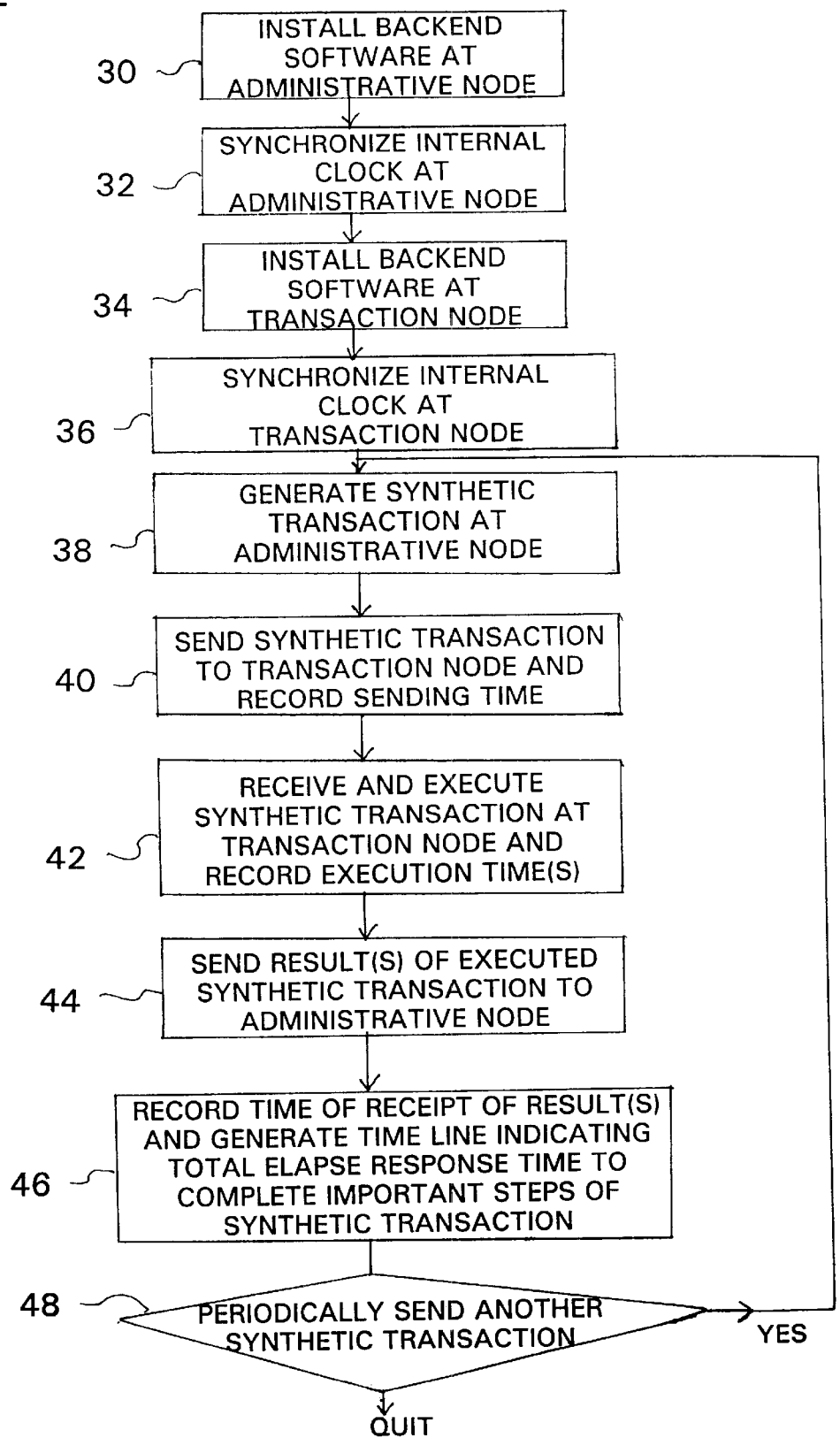
FIG. 2 is a simplified flow diagram showing one embodiment of the monitoring system according to the present invention.

Turning now to FIG. 1, a basic overview concerning the components necessary for utilization of in the present invention will now be described. As can be seen in FIG. 1, a communication system, such as the INTERNET, the world wide web, a wide area network, a local area network, etc. is generally depicted as element 2. A plurality of remote nodes 4, which are all linked or connected to the communication system 2, are also shown in this Figure. It is to be appreciated that the number of remote nodes 4 can vary from application to application, depending upon the specific requirements of the communication system. For the sake of simplicity, the present invention will only be described with reference to a pair of remote nodes 4, e.g. an administrative node 5 and a transaction node 7, it being understood that the teaching of the present invention is applicable to various embodiments in which at least one remote node contacts at least one other remote node to request data, drawing(s), diagram(s), information, etc.

Each remote node generally comprises a monitor 6, to facilitate viewing of the displayed data, drawing(s), diagram (s), information, etc., which is connected by conventional cabling 8 to a computer 10. The computer 10 typically has a plurality of conventional internal components such as a central processing unit (CPU), ROM, RAM, a hard disc drive, computer software, an internal real-time clock, a modem 20, etc. In addition, each remote node 4 includes at least one input device 12, and generally a pair of input devices such as a keyboard and a mouse (not separately shown), which are connected by conventional cabling 14 to the computer 10. Each remote node 4, in turn, is connected to a desired communication system 2, via conventional cabling 16, e.g. a convention telephone line which has a first end connected to a port of the modem 20 and a second end connected to a conventional communication port of the local phone system or cable system, for example. As such connection to the communication system is conventional and well known in the art, a further detailed description concerning the same is not provided.

Each one of the remote nodes 4, connected to the communication system 2, is generally loaded with a desired frontend software program(s) 22, such as Windows NT®, Word®, Excel, WordPerfect, etc. Typically the frontend software 22 is an interactive software which facilitates manipulation of the software by the user through utilization of the input device or devices 12. As the frontend software 22 is conventional and well known in the art, and forms no part per se of the present invention, a detailed description concerning such frontend software is not provided.

In addition, at least two of the remote nodes are provided with backend software 24 in order to facilitate communication between one another according to the present invention. The backend software 24 is a computer program which runs in the background of the computer operating system and is typically only interactive with an administrator, for example, not the user of the remote node. The backend software 24 manages and facilitates the monitoring of the functions executed by the frontend software 22 for a synthetic transaction and is completely transparent or invisible to the user of the remote node.

As note above, the present invention is directed at monitoring the total elapsed response time required to execute a desired command at a web server or some other desired remote node. In order to facilitate use of the present invention, one of the remote nodes which incorporates the backend software 24 will issue a command to be executed and that remote node is hereinafter referred to as the "administrative node 5". The second remote node which incorporates the backend software 24 and to which the command is directed by the administrative node is hereinafter referred to as the "transaction node 7". Preferably, a proxy server, forming part of the communication system (FIG. 1) is also loaded with the backend software 24. Once the backend software 24 is properly installed on the computers of at least these two remote nodes, and preferably the proxy server, the system is ready for utilization. A detailed description concerning the features of the backend software 24 will be described below in further detail.

With reference to FIGS. 1—5, a detailed description concerning the process steps, according to the system of the present invention, will now be described. According to the present invention, the first step 30 is the installing of the backend software 24 at the administrative node 5 and installing the backend software 24 at the transaction node, step 34. Next, the internal real-time clocks of the computer 10 at both the administrator node 5 and the transaction node 7 must be synchronized, and this is done at steps 32 and 36. Generally the backend software 24, upon initialization, will automatically synchronize the real-time clock of the computer of the remote node or, alternatively, a synchronization command can be sent by the administrative node 5 to the transaction node 7, for example, when the timing of a desired command to be executed is desired.

Following synchronization of the real-time clocks of both the administrative node 5 to the transaction node 7, a synthetic transaction, i.e. any desired variable command directing the transaction node 7 to execute a function is generated, at step 38, and sent by the administrative node 5, at step 40, to the transaction node 7 and the instance at which such synthetic transaction is sent is recorded or documented. The transaction node 7 receives the synthetic transaction and records the instance at which the synthetic transaction is received at the transaction node 7. The transaction node 7 then executes the necessary command(s) for completing the synthetic transaction and records or documents the time required to complete each important or desired step in order to complete the synthetic transaction, at step 42. Next, the result(s), e.g. data, drawing(s), diagram(s), information, etc., of the executed synthetic transaction are sent by the transaction node 7, at step 44, to the administrative node along with the recorded time information relating to the instance at which the synthetic transaction is received and the time required to complete each important or desired step in order to complete the synthetic transaction. Finally, at step 46, the time of receipt of the result(s) of the executed synthetic transaction is recorded by the administrative node 5 and the total elapsed response time for completion of the synthetic transaction is determined by the administrative node 5.

Figure 3:
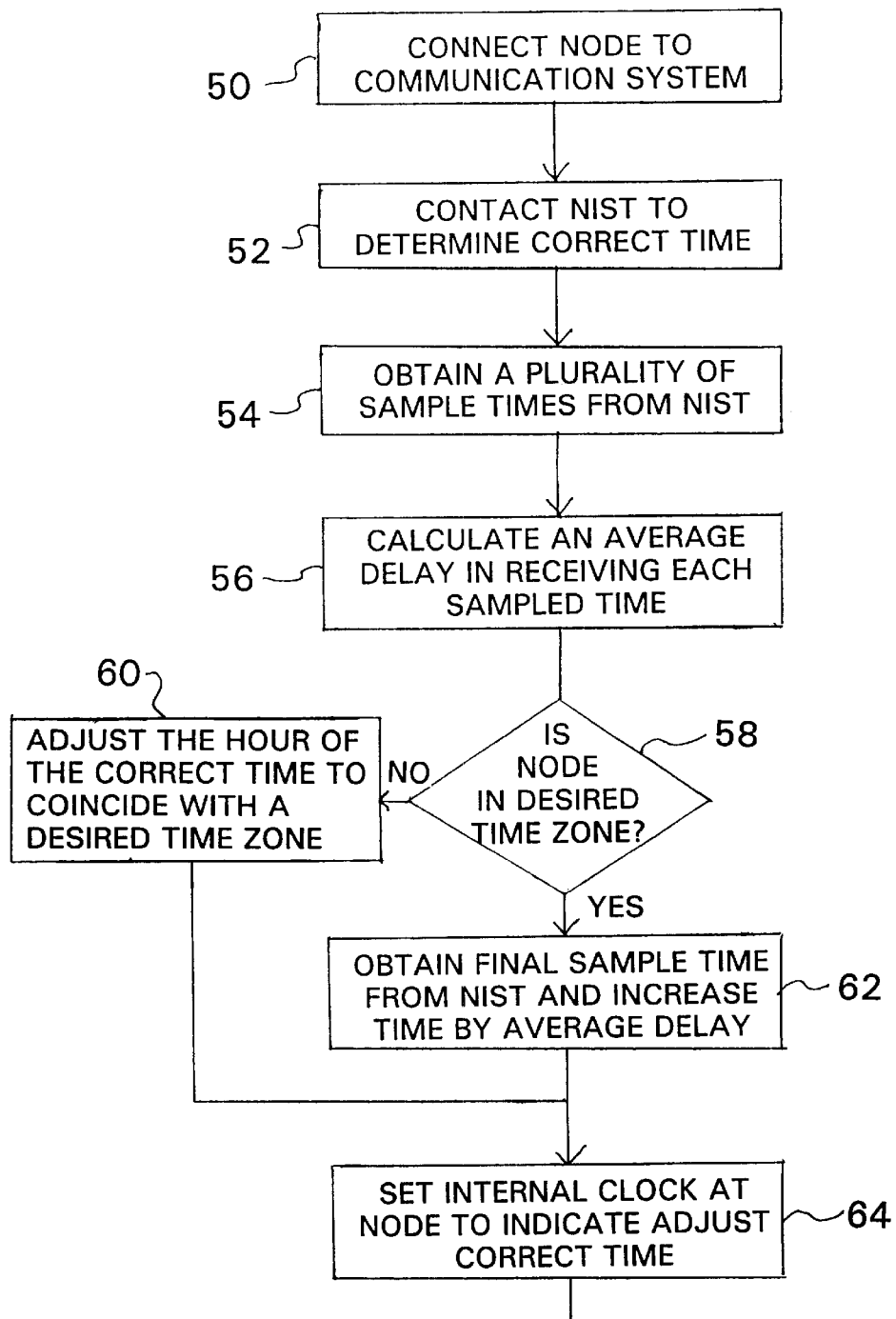
FIG. 3 is a simplified flow diagram showing one embodiment for synchronizing the real-time clocks of the administrative node and the transaction node, according to the present invention.

As seen in FIG. 3, a flow diagram relating to the synchronization process of the real-time clock for both the administrative node 5 and the transaction node 7 with the atomic clock at the National Institute of Standards and Technology, hereinafter referred to as "NIST", is shown. At step 32 or 34, the backend software 24 of the administrative node 5 or the transaction node 7 commences operation, using the communication interface of the remote node, e.g. the modem 20, and contacts the NIST computer over the communication network 2 (see FIG. 1), at step 52. It is to be appreciated that a connection from the node to the communication system 2 was already previously established at step 50. The backend software 24 first records the local time zone of the NIST clock being contacted as well as the local time of the remote node 4. A plurality of time samples are then collected from the clock at the contacted NIST site 51, at step 54. The plurality of collected time samples are then averaged, at step 56, in a conventional manner to determine an average time delay experienced from the instance at which the time request is made by the administrative node 5 to the instance at which the time sample is received by the administrative node 5 from the clock at the contact NIST site 51.

Next, at step 58, the time zone of the remote node is then compared with a desired time zone to determined if the hour of the time received from the NIST clock is to be modified, e.g. increased or decreased by one or more hours to coincide with the hour of the desired time zone. If the NIST clock is displaying the "correct" time for the desired time zone, then the process proceeds directly to step 62, without any modification, and one final time sample is obtained from the NIST clock and the calculated average time delay is combined with the final time sample received from the NIST clock. Lastly, the real-time clock of the computer is then set, at step 64, to the display the correct time, as modified by step 62, so that the remote node's real-time clock is now synchronized with the correct time of the contacted NIST clock.

Alternatively, if the time zone of the remote node is different from the desired time zone, the hour feature of the time must be modified and the process proceeds to step 60. At step 60, the magnitude of the hour adjustment for the final time sample is determined, e.g. the number of hour(s) the final time sample must be increased or decreased to coincide with the hour of the desired time zone. Once this hour adjustment is determined, it is combined (added with or subtracted from) the final time sample obtained from the NIST clock and then combined with the calculated average time delay, prior to setting the real-time clock of the computer, at step 64, to the display the correct time of the contacted NIST clock.

The backend software 24 simultaneously performs this task at both the administative node 5 and the transaction node 7, within a very short period of time, e.g. a few seconds or so, so that both real-time clocks will be synchronized with one another and with the time of the NIST clock following completion of the synchronization procedure. The net result of this procedure is that the real-time clocks of both remote nodes are now set to a common baseline time which is dictated by the correct time displayed by the atomic NIST clock. It is critical that the real-time clocks of both remote nodes have their real-time clocks synchronized to a common baseline time with a deviation error of no more than about two seconds. Most preferably, the displayed time of the real-time clocks at both remote nodes should deviate from one another by less than one-half second.

It is to be appreciated that the National Institute of Standards and Technology has atomic clocks located throughout the country. Depending upon the location of the administrative node 5 and the transaction node 7, these remote nodes can be programmed to contact the closest location of the NIST facility or the remote nodes can be programmed to contact a number of different sites and use the received time sample information from the contacted NIST facilities to obtain the average time delay for synchronizing the real-time clocks of the administrative node and the transaction node. As such modification is within the ability of those skilled in this art, a further detail discussion concerning the same is not provided.

Figure 4:
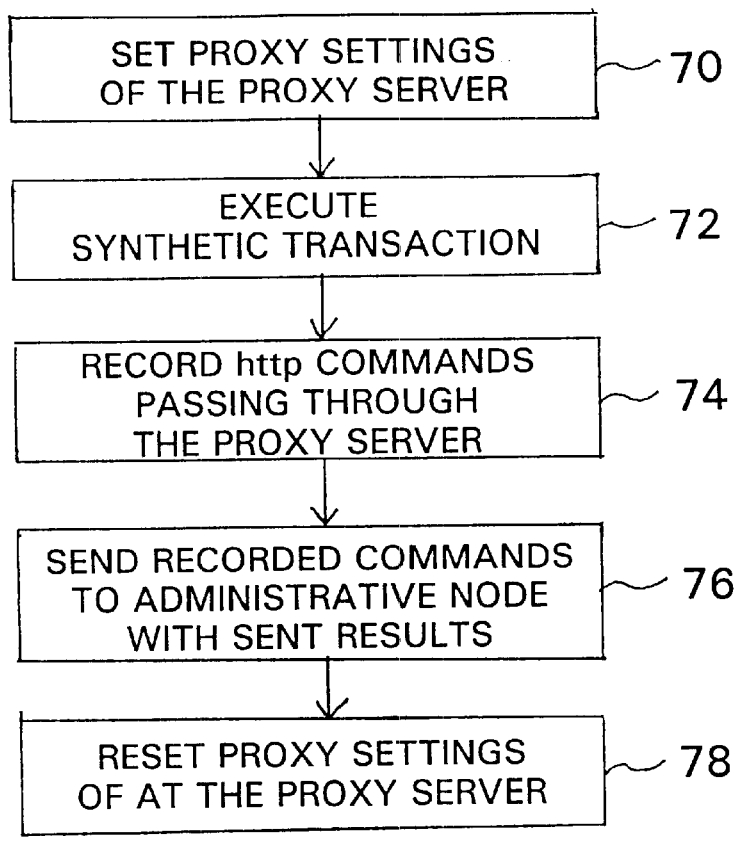
FIG. 4 is a simplified flow diagram showing one embodiment for creating a synthetic transaction, according to the present invention.

Once synchronization of real-time clocks at both the administrative node and the transaction node has occurred, the execution of a desired command can now be precisely timed by the monitoring system according to the present invention. With reference to FIG. 4, a flow diagram for executing a synthetic transaction sent by the administrative node 5, through a proxy server 9 forming part of the communication system 2, and executed by the transaction node 7 will now be described. The proxy server 9 is a server that operates between a client application, e.g. between a web browser, such as the administrative node 5, and a real server, such as the transaction node 7. As is well known in this art, a server is a computer or device that allocates resources for a network.

It is to be appreciated that the administrative node 5, at this point in time, has already established a link with the transaction node 7, via the proxy server 9, as conventionally occurs in the communication system described above with reference to in FIG. 1. As can be seen in FIG. 4, the settings of the proxy server are set, at step 70, by the administrative node 5 (web browser) with the backend software 24. The administrative node, which manages all facets of the synthetic transaction, sends the synthetic transaction to the transaction node 7 via the proxy server 9. At step 72, the synthetic transaction is received by the transaction node 7, which has the web server running on it, and the results of the executed command(s) are then sent to the administrative node 5 via the proxy sever 9. During this entire process, the proxy server 9 receives and records, at step 74, all of the http and/or other commands passing therethrough. This recorded information is the time stamped history of when the synthetic transaction occurred by utilization of the clock synchronization described earlier. This recorded time stamp information is then sent to the administrative node 5, at step 76, along with the results of the executed synthetic transaction. The instance that the results of the synthetic transaction are received at the administrative node 5, the time of the real-time clock time is documented or recorded and this signifies completion of the synthetic transaction. Finally, the settings of the proxy server 9 are reset, at step 78, to facilitate the timing of the execution of another command received via the same proxy server 9.

A comparison of the two time stamped records, one generated at the administrative node 5 relating to the total elapsed time to transmit and receive the results of the synthetic transaction from the transaction node 7 and the other time stamped record relating to the time required by transaction node 7 to receive and executed the synthetic transaction, will help identify if there are any bottleneck(s) in the communication system, e.g. the two superimposed time stamped records can facilitate production of a combined time line which will identify the step or steps which require a substantial time to execute.

Figure 6:
FIG. 6 is an example of a time line, generated by the administrative node of the total elapsed response time required to execute a command.
Figure 7:
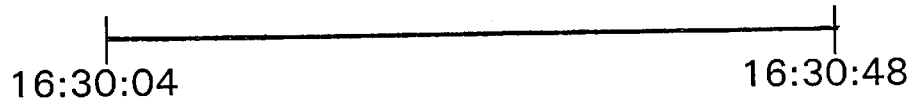
FIG. 7 is an example of a time line, generated by the transaction node, of the elapsed time required to execute a step of the executed command.
Figure 8:
FIG. 8 is an example of a combined time line, generated by the administrative node, of the total elapsed time required to execute the command following completion of the executed command.

For example, suppose the administrative node 5 and the transaction node 7 have their real-time clocks synchronize with the NIST atomic clock at a time of 16:30:00:00. The administrative node 5 then sends a command through the communication system 2 and the proxy server 9 to the transaction node 7 (FIG. 6). The transaction node 7 receives the command and records receipt of the command at time 16:30:04:00 (FIG. 7), for example. The web server, at the transaction node 7, executes the received command (requesting transmission of the index.html file, for example) and retrieves the index.html file. The transaction node 7 sends the retrieved index.html file to the administrative node 5, via the communication system, and the transmission time is recorded as time 16:30:48:00, for example (FIG. 7). The administrative node 5 finally receives the requested index.html file at time 16:30:55:00 and records this time (FIG. 6). Based upon this example, the administrative node 5 is able to generate a time line for the total elapsed response time to complete the synthetic transaction as shown in FIG. 6. When the information relating to the time required to execute the commands at the transaction node 7 (FIG. 7) is combined with the total elapsed time information from the administrative node 5 (FIG. 6), the combined resulting time is shown in FIG. 8:

55 sec. (the total response time)=4 sec. (Internet)+44 sec. (web server)+7 sec. (Internet).

The monitoring system of the present invention can be run a desired number of times (e.g. a few times to hundreds or thousands of times sequentially or spaced at desired time intervals throughout the day) to obtain an average total response time required to execute a particular command at a desired transaction node. With this combined time information, a system administrator can utilize this information to streamline or decrease the web server's response time by first, locating where the bottleneck or bottlenecks occur, and, secondly, by removing or streamlining the bottleneck or bottlenecks to improve the response time for executing the command.

This is accomplished, usually through a frontend graphic user interface which is employed to manage the system, at step 80. An administrator uses the frontend graphic user interface to create a "work schedule" for the agent, at step 82. An agent is a software program that runs automatically on a computer, such as the transaction node, that is comprised of three components, namely, the Listener, the Scheduler, and the Executor. The Listener listens for new "work schedules" at a well-known port and informs the Scheduler whenever it receives a new "work schedule." The Scheduler updates its time diary on receipt of a new "work schedule" and assigns the tasks to the Executor at the schedule times. The Executor executes the tasks supplied by the Scheduler. The Executor issues the commands that make up the transaction to the web server. The tasks are the synthetic transaction(s) which the Executor implements using, for example, the http protocol.

Figure 5:
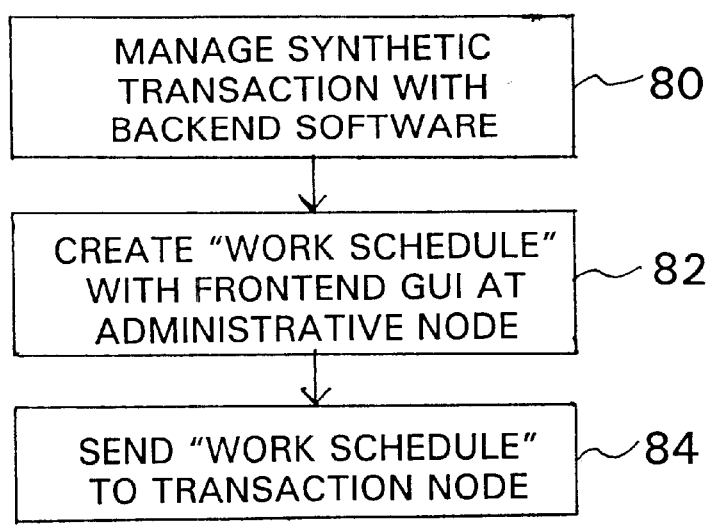
FIG. 5 is a simplified flow diagram showing one embodiment for assigning execution of the tasks, according to the present invention.

The backend software, FIG. 5, will submit the "work schedule" to the remote agent on behalf of the system administrator, at step 84. The remote agent, the agent running on the transaction node, listens for the new "work schedule." The remote agent Scheduler then assigns the tasks to the Executor. Finally, the Executor executes the tasks supplied by the Scheduler.

Although the present invention specifies utilizing the worldwide web to contact the National Institute of Standards and Technology to determine the correct time to be employed for synchronizing the real-time clocks of the computers, it is to be appreciated that other forms of communication, to collect sample time information, can be employed. For example, instead of using the world wide web, the sample time information can be received by a fax modem input into the computer and the fax modem can receive a plurality of sample times from either a single or a plurality of different NIST locations to obtain the resulting average time delay to be utilized in adjusting the final time sample obtained from the NIST clock and utilized to set the real-time clock of the remote node. Alternatively, both the administative node 5 and the transaction node 7 can be provided with a conventional radio signal receiving device 90 for communicating, via the air waves, with a desired NIST location to collect time samples and a final time sample via radio transmission.

It is to be appreciated that a variety of different methods can be employed to obtain the resulting average time delay to be added to the final time sample or reading from the NIST clock and used for setting the real-time clock of the computer. For example, each remote node can be programmed to collect a plurality of sample times from the NIST clocks, e.g. nine (9) sample times, and the time delay from the instant when the command is sent to obtain the time from the NIST clock to the instant when the time is actually received from the NIST clock by the remote node is measured. Each time delay from the instant when the command is sent to the instant when the time is actually received is recorded for each of the nine (9) sampled time readings. Thereafter, each measured time delay is arranged in sequential order from the smallest time delay to the largest time delay. Once this has occurred,the three (3) highest time delays and the three (3) lowest time delays are discarded and the remaining three (3) time delays are averaged with one another. Alternatively, all of the measured times can be employed to determine a standard deviation of the delay time or all of the measured time delays can be arranged in ascending order and the mean delay time, i.e. the middle time delay of the plurality of odd number of collected sample times from the NIST clock, is utilized as the time delay to be combined with the final time sample or reading from the NIST clock and used for setting of the real-time clock.

There are also a variety of other conventional formulas for averaging the plurality of collected time delays for obtaining an average time delay to be combine with the final time sample reading from the NIST clock for use in setting the real-time clock of the remote node. As such other formulas are conventional and well known in the art, a further detailed description concerning the same is not employed.

It is to be appreciated that the installation of the backend software 24 is preferably done manually at the remote node(s) by physically loading or installing the backend software 24 on the computer 10. It is also possible, however, for the administrative node 5 to contact the transaction node 7, via the communication system, and install the backend software 24 via the communication system 2. Once the backend software 24 is correctly installed on the transaction node 7, the administrative node 5 can then send a command to the transaction node 7 to initialize the real-time clock in accordance with the teaching of the present invention, for example, see FIG. 4.

It is also conceivable that the administrative node 5 can send a command to the transaction node 7 each time the monitoring system desires to measure the time required to execute a command at the transaction node 7. Alternatively, both the administrative node 5 and the transaction node 7 can be preprogrammed to periodically resynchronize their real-time clocks, e.g. resynchronize the real-time clock once every few hours, once everyday, once a week, once a month, etc. As such preprogramming feature is conventional and well known in the art, a further detailed description concerning the same is not provided.

With respect to time zone differentials between the administrative node 5 and the transaction node 7, it is to be appreciated that the backend software 24 can be preprogrammed to adjust the hour of the correct time, determined from the NIST, to a desired time zone, e.g. the Greenwich Time Zone, the Eastern Time Zone, the Central Time Zone, the Pacific Time Zone, etc. If, for example, the Eastern Time Zone is selected and the transaction node 7 is located in the Central Time Zone, the initialization of the real-time clock of the transaction node 7 will proceed as set forth above. However, prior to setting the real-time clock of the computer 10 at the transaction node 7, one (1) hour will be added to or subtracted from the final time reading, obtained from the NIST clock, along with the addition of the average time delay. If, for example, the administrative node 5 is located in the Eastern Standard Time, no hour adjustment will be required prior to setting the clock at step 64, provided that the selected baseline time zone is the Eastern Time Zone.

In addition to the above disclosed methods for synchronizing the real-time clocks of the administrative node 5 and the transaction node 7 with one another, it is conceivable that there are other arrangements which would also be readily apparent to those skilled in the art, e.g. synchronize the clock of the administrative node 5 with the clock of the transaction node 7, or vice versa. The important aspect of the present invention is that the real-time clocks of both the administrative node 5 and the transaction node 7 are synchronized with one another, not the precise method by which such clock synchronization is achieved.

It is to be appreciated that while the present invention is briefly described with reference to a single executed command at the transaction node 7, it is to be understood that a variety of commands can be executed substantially concurrently with one another, e.g. in series or in parallel with one another. Further, the transaction node 7 could be required to execute a command requiring the transaction node 7 to contact another remote node(s), e.g. to verify placing a charge on a supplied credit card number or debiting a "smart card". Therefore, regardless of the kind or type of command or commands being executed at the transaction node 7, the present invention is designed to provide time stamp information which facilitates measuring the total elapsed response time required to execute each important step of an associated command and thereby provide the monitoring system with adequate monitoring information. Such monitoring information can then be used in facilitating a reduction in the elapsed response time required to execute the command or command(s) at the transaction node 7.

While the above identified application merely refers to a single administrative node communicating with the transaction node via the communication system, it is to be appreciated that a plurality of different administrative nodes, located in various cities throughout the country, may be employed to contact the same transaction node to gather information concerning the total response time for executing the synthetic transaction or a variety of synthetic transactions. If a plurality of administrative nodes are utilized to contact the same transaction node, the administrative nodes can be programmed to operate in parallel with one another, e.g. generate and send synthetic commands at the same time, or in series with one another, i.e. only operate once another administrative node has completed its determination of the total response time for executing the synthetic transaction at the transaction node.

Since certain changes may be made in the above described monitoring system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I claim:

1. A system for monitoring a total response time for executing a synthetic transaction over a communication system, said monitoring system comprising:

a communication system for conveying information;

an administrative node being coupled to the communication system and the administrative node having an internal clock;

a transactional node being coupled to the communication system and the transactional node having an internal clock;

means for synchronizing the internal clock of both the administrative node and the transaction node to display an identical time;

means for generating and sending a synthetic transaction from the administrative node to the transaction node for execution via the communication system and recording the sending time of the synthetic transaction;

means for receiving and executing, at the transaction node, the synthetic transaction sent by the administrative node while recording a time of receipt of the synthetic transaction and a required time to complete each desired step of the synthetic transaction;

means for transmitting a result of the synthetic transaction to the administrative node, via the communication system, along with time information indicating the time required to complete each desired step of the synthetic transaction; and means for generating the total response time required to execute the synthetic transaction.

2. The monitoring system according to claim 1, wherein the means for synchronizing comprises:

means for requesting and receiving a plurality of time samples from a desired clock, via the communication system, and determining an average time delay from an instance when a request for a time sample is made by the administrative node to an instance when the requested time sample is received by the administrative node; and means for combining a final requested time sample, received from the desired clock, with the determined average time delay and using this combined time to synchronize the internal clock of the administrative node;

means for requesting and receiving a plurality of time samples from a desired clock, via the communication system, and determining an average time delay from an instance when a request for a time sample is made by the transactional node to an instance when the requested time sample is received by the transactional node; and means for combining a final requested time sample, received from the desired clock, with the determined average time delay and using this combined time to synchronize the internal clock of the transactional node.

3. The monitoring system according to claim 2, wherein the means for synchronizing further comprises:

means for adjusting the final requested time sample of at least one of the transactional node and the administrative node so that an hour component of the final requested time coincides with an hour component of the desired time zone.

4. The monitoring system according to claim 2, wherein said means for synchronizing further comprises:

means for adjusting an hour of the final time sample, prior to synchronization of the internal clock of at least one of the administrative node and the transactional node, to compensate for any time zone difference between a location of the administrative node and a location of the transactional node.

5. The monitoring system according to claim 1, wherein the means for synchronizing further comprises:

means for requesting and receiving a plurality of time samples from the internal clock at the transactional node and determining an average time delay from an instance when a request for a time sample is made by the administrative node to an instance when the requested time sample is received by the administrative node from the transactional node; and means for combining a final requested time sample, received from the transactional node, with the determined average time delay and using this combined time to synchronize the internal clock of the administrative node with the internal clock of the transactional node.

6. The monitoring system according to claim 1, wherein the means for synchronizing further comprises:

means for requesting and receiving a plurality of time samples from the internal clock at the administrative node and determining an average time delay from an instance when a request for a time sample is made by the transactional node to an instance when the requested time sample is received by the transactional node from the administrative node; and means for combining a final requested time sample, received from the administrative node, with the determined average time delay and using this combined time to synchronize the internal clock of the transactional node with the internal clock of the administrative node.

7. The monitoring system according to claim 1, wherein said means for generating and sending a synthetic transaction further comprises:

means for setting settings of a server forming part of the communication system;

upon transmission of the synthetic transaction, means for recording time information, via the server, relating to all important data passing through the server; and means for sending the time information, recorded by the server, to the administrative node along with the result of the synthetic transaction.

8. The monitoring system according to claim 7, wherein said means for generating and sending a synthetic transaction further comprises:

means for resetting the settings of the server following completion of the synthetic transaction.

9. The monitoring systems according to claim 1, wherein said means for synchronizing the internal clock of both the administrative node and the transaction node to display an identical time is coupled to receive time information supplied via the communication systems.

10. The monitoring system according to claim 1, wherein said means for synchronizing further comprises a mechanism for establishing a modem connection, between the administrative node and a desired first clock, to receive time information; and means for establishing a modem connection, between the transaction node and a desired second clock, to receive time information; and both the desired first and second clocks display identical times.

11. The monitoring device according to claim 2, wherein at least one of said transaction node and said administrative node is provided with means for adjusting an hour component of at least the final requested time sample received from the desired clock to facilitate modification of the final requested time sample to a desired time zone.

12. The monitoring system according to claim 1, wherein said means for synchronizing further comprises a mechanism for establishing a wireless connection, between the administrative node and a desired first clock, to receive time information; and means for establishing a wireless connection, between the transaction node and a desired second clock, to receive time information; and both the desired first and second clocks display identical times.

13. The monitoring system according to claim 1, wherein said means for synchronizing further comprises:

means for contacting a desired first clock to receive time information for synchronizing the internal clock of the transaction node; and means for contacting a desired second clock, separate from the first clock, to receive time information for synchronizing the internal clock of the administrative node.

14. A system for monitoring a total response time for executing a synthetic transaction over a communication system, said monitoring system comprising:

a communication system for conveying information;

an administrative node being coupled to the communication system and the administrative node having an internal clock;

a transactional node being coupled to the communication system and the transactional node having an internal clock;

means for synchronizing the internal clock of both the administrative node and the transaction node to display an identical time;

means for generating and sending a synthetic transaction from the administrative node to the transaction node for execution via the communication system and recording the sending time of the synthetic transaction;

means for receiving and executing, at the transaction node, the synthetic transaction sent by the administrative node while recording a time of receipt and a required time to complete each desired step of the synthetic transaction;

means for transmitting a result of the synthetic transaction to the administrative node, via the communication system, along with time information indicating the time required to complete each desired step of the synthetic transaction;

means for generating the total response time required to execute the synthetic transaction;

wherein the means for synchronizing comprises:

means for requesting and receiving a plurality of time samples from a desired clock, via the communication system, and determining an average time delay from an instance when a request for a time sample is made by the administrative node to an instance when the requested time sample is received by the administrative node;

means for combining a final requested time sample, received from the desired clock, with the determined average time delay and using this combined time to synchronize the internal clock of the administrative node;

means for requesting and receiving a plurality of time samples from a desired clock, via the communication system, and determining an average time delay from an instance when a request for a time sample is made by the transactional node to an instance when the requested time sample is received by the transactional node;

means for combining a final requested time sample, received from the desired clock, with the determined average time delay and using this combined time to synchronize the internal clock of the transactional node;

means for adjusting an hour of the final time sample, prior to synchronization of the internal clock of at least one of the administrative node and the transactional node, to compensate for any time zone difference between a location of the administrative node and a location of the transactional node; and said means for generating and sending a synthetic transaction further comprises:

means for setting settings of a server forming part of the communication system;

upon transmission of the synthetic transaction, means for recording time information, via the server, relating to all important data passing through the server; and means for sending the time information, recorded by the server, to the administrative node along with the result of the synthetic transaction; and means for resetting the settings of the server following completion of the synthetic transaction.

15. A method for monitoring a total elapsed response time for executing a command over a communication system, the method comprising the steps of:

providing a communication system for conveying information;

coupling an administrative node to the communication system and providing the administrative node with an internal clock;

coupling a transactional node to the communication system and providing the transactional node with an internal clock;

synchronizing the internal clock of both the administrative node and the transaction node to display an identical time;

generating and sending a synthetic transaction from the administrative node to the transaction node for execution via the communication system and recording the sending time of the synthetic transaction;

receiving and executing, at the transaction node, the synthetic transaction sent by the administrative node while recording a time of receipt of the sent synthetic transaction and a required time to complete each desired step of the synthetic transaction;

transmitting a result of the synthetic transaction to the administrative node, via the communication system, along with time information indicating the time required to complete each desired step of the synthetic transaction; and generating the total response time required to execute the synthetic transaction.

16. The method according to claim 15 further comprising the step of modifying one of the communication system and the transactional node to decrease the response time for executing the synthetic command over the communication system.

\* \* \* \* \*